United States Patent [19]

Heinecke et al.

[11] Patent Number: 4,684,535

[45] Date of Patent: Aug. 4, 1987

[54] SURFACE TREATMENT OF PLASTICS MATERIAL

[75] Inventors: Rudolf A. H. Heinecke; Suresh M. Ojha; Ian P. Llewellyn, all of Harlow, United Kingdom

[73] Assignee: Standard Telephones & Cables, London, England

[21] Appl. No.: 890,891

[22] Filed: Jul. 28, 1986

Related U.S. Application Data

[63] Continuation of Ser. No. 706,791, Feb. 28, 1985, abandoned.

[30] Foreign Application Priority Data

Mar. 3, 1984 [GB] United Kingdom ................ 8405648

[51] Int. Cl.⁴ .......................... B05D 3/02; B05D 3/06
[52] U.S. Cl. ..................................... 427/38; 427/45.1; 427/140; 427/316
[58] Field of Search ................... 427/38, 39, 40, 45.1, 427/316, 322, 140, 162, 164, 444; 428/411, 412

[56] References Cited

U.S. PATENT DOCUMENTS

| | | | |
|---|---|---|---|
| 4,337,279 | 6/1982 | Polak | 427/40 |
| 4,395,434 | 7/1983 | Imada et al. | 427/38 |
| 4,396,641 | 8/1983 | Imada et al. | 427/40 |

FOREIGN PATENT DOCUMENTS

| | | | |
|---|---|---|---|
| 0057374 | 8/1982 | European Pat. Off. | 427/38 |
| 57-34137 | 2/1982 | Japan | 427/39 |
| 2031439 | 4/1980 | United Kingdom | 427/38 |
| 2051087 | 1/1981 | United Kingdom | 427/38 |
| 2061969 | 5/1981 | United Kingdom | 427/38 |
| 2105729 | 3/1983 | United Kingdom | 427/38 |

Primary Examiner—Sadie L. Childs
Attorney, Agent, or Firm—Kerkam, Stowell, Kondracki & Clarke

[57] ABSTRACT

Discontinuities, e.g. scratches, in a plastics surface are removed by exposing the surface to a pulsed radio frequency plasma comprising a mixture of argon and hydrogen. After melting has been effected the surface is exposed to an argon plasma to effect cross-linking to form a smooth surface layer.

10 Claims, 1 Drawing Figure

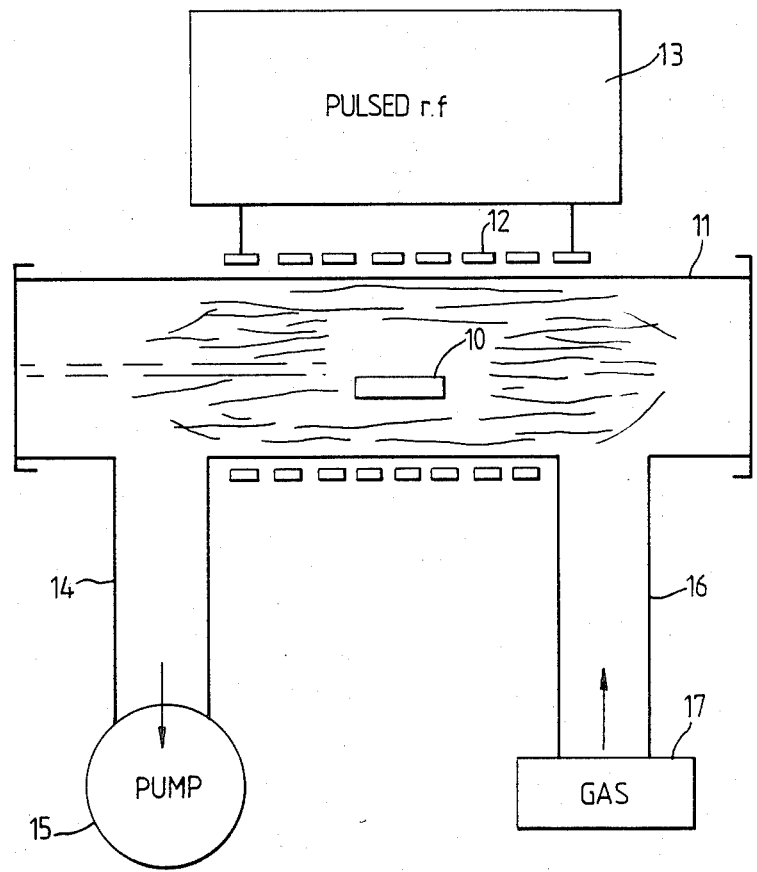

SURFACE TREATMENT OF PLASTICS MATERIAL

This is a continuation of application Ser. No. 706,791, filed Feb. 28, 1985 now abandoned.

This invention relates to the surface treatment of plastics materials and in particular to techniques for removing surface dissolution materials.

Surface flaws such as scratches are quite common on plastics products and components. Where the component is used in a continual application, e.g. as an optical element, such flaws may have a deleterious effect on performance. Also, in applications where a surface coating is to be applied to the component the coating integrity may be limited by the presence of surface discontinuities.

Removal of surface discontinuities may in some instances be effected by melting of the plastics material. However this is not possible with many plastics materials and may of course lead to deformation of the component itself. A possible solution to this problem is the use of plasma melting techniques and in particular pulsed plasma techniques which heat only the surface of the component. UK Patent Application No. 2105729 A (R. A. H. Heinecke-S. M. Ojha-M. J. Cooke 30-2-2) for example describes a process for surface processing a heat sensitive substrate material comprising exposing the surface of the substrate to a high intensity radio frequency pulsed plasma of low average power, the plasma pulse producing a power density of at least a few kW per liter.

Although surface heating can be achieved by the process described in application No. 2105729A it is difficult to provide adequate surface melting as the cross-linking action of the plasma increases the effective melting temperature.

The object of the present invention is to minimise or to overcome this disadvantage.

According to the invention there is provided a process for removing discontinuities from a plastics surface by fusion of that surface, the process including exposing the surface to a pulsed radio frequency plasma, the major or sole constituent of which is argon.

By the use of a pulsed argon plasma effective surface melting can be achieved. Advantageously the plasma contains up to 30 volume % hydrogen. This has been found to reduce the radio-frequency power required to effect surface melting. It is thought that the chemical action of the hydrogen atoms generated in the plasma reduces the average molecular weight at the plastics surface and thus reduces the surface melting point. Once the smoothing action is complete, usually after a few minutes, the surface may then be exposed to a hydrogen-free argon plasma the cross-linking action of which then raises the surface melting point.

An embodiment of the invention will now be described with reference to the accompanying drawing in which the single FIGURE is a schematic diagram of a pulsed plasma treatment apparatus.

Referring to the drawing, a plastics component 10 whose surface is to be treated is placed in a vacuum chamber 11. That portion of the chamber 11 in which the component 10 is mounted is surrounded by a coil 12 connected to a pulsed radio frequency generator 13. The power output of the generator is not critical but must of course be sufficient to induce surface melting of the component 10. We have found that a 60 kW generator is adequate for this purpose. Advantageously the generator provides a power density of 2 to 3 kw/liter. Typically the pulse width is 1 to 5 ms and the repetition frequency 5 to 20 Hz. Preferably the gas pressure is 10 to 200 m torr. The chamber 11 may be evacuated via an outlet 14 leading to a pump 15 and may be supplied with gases or vapours from an inlet manifold 16 via an inlet tube 17.

In use the component 10 is inserted into the chamber 11 which is then evacuated through the outlet 14. Argon, or a mixture of argon and hydrogen, is admitted to the chamber via the inlet 17 and the generator is switched on to initiate the plasma thereby including surface melting of the plastics component 10. We have found that the volume proportion of hydrogen in the plasma should not exceed 30%. Excessive hydrogen reduces the surface molecular weight to such an extent that ablation is effected and the surface is etched. The optimum concentration of hydrogen in argon has been found to be between 5 and 10 volume %.

When smoothing is complete, typically after 1 to 10 minutes, the hydrogen supply to the plasma is switched off and the component is exposed to an argon plasma. This effects cross-linking of the surface and increases the melting point. The generator may then be turned off and the chamber back-filled to atmospheric pressure. We have found that melting can be achieved without the use of hydrogen by increasing the generator power. Under such conditions the plastics surface melts, i.e. smoothing is effected, and then cross-links.

The following example illustrates the invention.

EXAMPLE

Polycarbonate discs 2 inch in diameter were examined using scanning electron microscope (SEM) techniques for surface discontinuities. The disc surfaces displayed scratches and globules, the average discontinuities being 30 microns.

The discs were exposed to an argon plasma at a pressure of 100 m torr for 8 minutes. The generator pulse width was 2 ms and the repetition frequency was 14 Hz. The calculated energy density was 2.5 kw/liter. After treatment was completed the mean surface discontinuity determined by SEM techniques were less than 200 nm.

This example demonstrates the feasibility of the techniques described herein.

In some applications the treated plastics component may be provided subsequently with a plasma deposited surface coating e.g. by a process such as that described in published UK application No. 2105729 or that described in our co-pending UK application No. 8405649 (R. A. H. Heinecke-S. M. Ojha 37-5) of even date.

We claim:

1. A process for removing discontinuities from a plastics surface by fusion and cross-linking of the surface, the process comprising the steps of:
    exposing the plastics surfaces to a first pulsed radio frequency plasma comprising argon as the major constituent and up to 30 volume percent of hydrogen, the hydrogen content of the plasma being such that the melting point of the plastics surface is reduced whereby the plastics surface is rendered molten and thereby smoothed and exposed the molten plastics surface to a second pulsed radio frequency plasma comprising argon for a sufficient period of time to effect cross-linking of the molten surface, thereby increasing the melting point of the surface.

2. A process as claimed in claim 1 wherein the plasma contains from 5 to 10 volume percent hydrogen.

3. A process as claimed in claim 1 wherein the plastics surface is subjected to an energy density of 2 to 3 kw/liter.

4. A process as claimed in claim 3, wherein the pressure of the plasma is 10 to 200 m torr.

5. A process as claimed in claim 4, wherein the pulse width is 1 to 5 ms.

6. A process as claimed in claim 5, wherein the pulse repetition frequency is 5 to 20 Hz.

7. A process as claimed in claim 1 wherein a coating is subsequently applied to the surface.

8. A process as claimed in claim 7, wherein said coating is a plasma deposited coating.

9. A process as claimed in claim 1, wherein a coating is subsequently applied to the surface.

10. A process as claimed in claim 9, wherein said coating is a plasma deposited coating.

* * * * *

UNITED STATES PATENT AND TRADEMARK OFFICE
CERTIFICATE OF CORRECTION

PATENT NO. : 4,684,535

DATED : August 4, 1987

INVENTOR(S) : Heinecke et al

It is certified that error appears in the above-identified patent and that said Letters Patent is hereby corrected as shown below:

Title page Item [73]:

Assignee: "Standard Telephones & Cables," should be --Standard Telephones & Cables, p.l.c.--.

Column 2, line 59, "surfaces" should be --surface--.
Column 2, line 65, "exposed" should be --exposing--.

Signed and Sealed this

Ninth Day of February, 1988

Attest:

DONALD J. QUIGG

*Attesting Officer*   *Commissioner of Patents and Trademarks*